United States Patent

Hakki

[15] 3,654,476

[45] Apr. 4, 1972

[54] SOLID-STATE TELEVISION CAMERA DEVICES

[72] Inventor: Basil W. Hakki, Scotch Plains, N.J.

[73] Assignee: Bell Telephone Laboratories, Incorporated, Murray Hill, N.J.

[22] Filed: Oct. 24, 1969

[21] Appl. No.: 871,371

Related U.S. Application Data

[62] Division of Ser. No. 638,417, May 15, 1967, Pat. No. 3,536,830.

[52] U.S. Cl.....................250/211 J, 317/235 N, 250/217 SS

[51] Int. Cl. ........................................................H01l 15/00

[58] Field of Search...............250/211, 211 J, 213 A, 217 SS; 317/234, 235

[56] References Cited

UNITED STATES PATENTS

| | | | |
|---|---|---|---|
| 3,434,008 | 3/1967 | Sandbank | 317/234 X |
| 3,492,489 | 1/1970 | Chynoweth | 317/234 X |
| 3,500,648 | 3/1970 | Forlani et al. | 250/211 |
| 3,502,802 | 3/1970 | Osborn et al. | 250/213 X |

*Primary Examiner*—Walter Stolwein
*Attorney*—R. J. Guenther and Arthur J. Torsiglieri

[57] ABSTRACT

Solid-state display and light-sensitive devices are described which comprise a plurality of strips of semiconductor material each having a bulk negative conductivity and containing a plurality of light elements along one surface. A sufficiently high DC voltage is sequentially applied to the strips to excite traveling electric field domains which in turn sequentially excite the light elements. In the display devices, the light elements are light-emitting diodes, the light output of which is modulated by an applied video signal, while in the light sensitive devices, they are light sensitive diodes from which a variable voltage is taken as an output video signal.

6 Claims, 7 Drawing Figures

INVENTOR
B. W. HAKKI
BY
R B Anderson
ATTORNEY

SOLID-STATE TELEVISION CAMERA DEVICES

This application is a division of patent application Ser. No. 638,417, filed May 15, 1967, now U.S. Pat. No. 3,536,830, issued Oct. 27, 1970.

BACKGROUND OF THE INVENTION

Virtually all television display devices and television camera devices in present commercial use are cathode ray tubes using a scanning electron beam. While it has long been recognized that these devices are inherently bulky and of limited durability, efforts at making commercially successful solid-state devices that perform these functions have not as yet been successful.

One proposed solid-state display unit comprises a sheet of piezoelectric material to which high voltage pulses are applied for simultaneously launching two traveling acoustic or elastic waves each of which is fairly localized and is accompanied by a traveling region of localized electric field. At locations at which the two acoustic waves intersect, their combined electric fields add to excite light emission from an electroluminescent layer bonded to one side of the piezoelectric sheet. The acoustic waves can be repetitively excited and synchronized with each other so that the light emitted scans the sheet to form a raster is a manner similar to that of a cathode ray display tube. A video signal applied to the electroluminescent layer modulates the emitted light to reproduce a desired image.

One of the unavoidable characteristics of such piezoelectric display units is the attenuation of the acoustic waves by the piezoelectric sheet and by the electroluminescent layer as acoustic wave energy is converted to emitted light. Further, the electroluminescent layer does not efficiently convert electrical current from the piezoelectric sheet to emitted light energy. For these and other reasons, devices of this type have not been commercially competitive with cathode ray display tubes.

SUMMARY OF THE INVENTION

Accordingly, it is an object of this invention to provide improved solid-state display devices.

It is another object of this invention to provide improved solid-state light-sensitive devices such as television camera devices.

These and other objects of the invention are attained in an illustrative embodiment thereof comprising a plurality of strips of semiconductor material each containing along one surface a plurality of light elements, which in the display units are electroluminescent, and in the camera units are photosensitive. A sufficiently high DC voltage is sequentially applied to the strips to excite traveling electric field domains which in turn sequentially excite the light elements. As will explained below, the semiconductor strips exhibit a voltage controlled bulk negative differential conductivity which results in a continuous regeneration of the traveling electric field domain as it travels from one end of the semiconductor strip to the other.

In one embodiment of the invention, the semiconductor strips are made of "two-valley" semiconductor material, a material characterized by two conduction band minima separated by only a small energy gap. By a phenomenon known as the "Gunn-effect," the applied DC voltage causes a population redistribution between the two bands which results in a bulk negative conductance and a nucleation of a high electric field domain near the negatively-biased contact (in N-type material); the domain grows in intensity to some saturation value and propagates in the direction of the positive contact. As it propagates, the high field domain excites the light elements arranged along the strip as described before. While power is supplied by the traveling domain to the light elements during each scan, there is no attenuation of the traveling domain because of the negative conductance of the bulk material; as a result, power is supplied continuously from the DC source to the piezoelectric strip to regenerate the traveling domain as it traverses the strip.

In another embodiment of the invention, the semiconductor strips exhibit piezoelectric characteristics and a bulk negative conductivity arises due to the interaction of majority carriers with acoustic or elastic waves that are propagated within the semiconductor. Acoustic waves are excited within each semiconductor strip merely by applying a prescribed DC voltage across the length of each strip, which, as will be explained later, is sufficiently high to nucleate a localized acoustic wave and an accompanying high electric field domain. The localized electric field domain then propagates at the sound velocity in the direction of flow of the majority carriers of the semiconductor strip, and, as before, scans the successive light elements. Because of the negative conductance or amplifying qualities of the semiconductor, the electric field domain is constantly regenerated to maintain its high localized intensity throughout its propagation.

The light elements may be P-N junction diodes made by using semiconductor strips of one conductivity type to which wafers of the opposite conductivity type are grown. In the display devices, the wafers of each strip are connected by individual capacitors to a common line, with a video signal source being sequentially switched to the lines simultaneously with the excitation of the domain in the respective semiconductor strips. No externally applied DC bias is applied across each diode junction; rather, each diode is biased by the voltage across the traveling domain as it traverses the junction. This bias causes junction light emission which is modulated by the video signal. In the television camera embodiment, the diode biased by the traveling domain gives a voltage output across the diode capacitor which is a function of absorbed light and therefore constitutes the video output signal. Alternatively, the video output may be taken as the fluctuating current in the semiconductor strip, as will be explained more fully later.

The semiconductor may also be overlayed with a layer of insulating material upon which a series of metal elements are bonded. Each metal element with the insulating layer and the semiconductor constitutes an MIS junction diode. As before, the traveling domain causes charge flow across the junction which in turn results in controllable light emission.

In another embodiment, pairs of MIS junction diodes along each semiconductor strip are directly interconnected and each MIS diode comprises a metal element bonded to the semiconductor strip, a first insulative layer, a semiconductor layer, a second insulator layer, and a top metal layer. A traveling domain, located between the diodes of each pair, biases both diodes to generate light emission. As will be explained more fully later, this embodiment is more efficient because each diode includes two light-emitting junctions; the diodes are less susceptible to internal breakdown because at any instant the voltage of an electric domain is divided among four junctions of a diode pair rather than being impressed across a single junction; a domain generates a constant voltage between diodes of a pair which gives more time for the generation of minority carriers and more efficient operation of the diodes.

One problem that may be encountered in using the acoustic wave version of the invention is that the electric field domains accompanying the acoustic waves may not reach their maximum value at identical locations along the various semiconductor piezoelectric strips. The nucleation of the high field domains can be made substantially identical in all of the semiconductor strips by initially exciting a Gunn-effect domain in each strip which in turn launches the acoustic wave. Accordingly, in another embodiment, each semiconductor piezoelectric strip includes an end portion made of two-valley material located between a pair of electrodes. When an electric field is applied across the piezoelectric strip and another DC field is applied across the two electrodes, a Gunn-effect domain is initially excited in the two-valley material. When this domain reaches the end of the two-valley material portion, it launches an acoustic wave in the remaining portion of the strip which in turn ensures predictable nucleation of the acoustic electric field domain. As before, the traveling acoustic wave domain is continuously regenerated by the DC electric field across the semiconductor piezoelectric strip.

DRAWING DESCRIPTION

These and other objects, features and advantages of my invention will be better understood from a consideration of the following detailed description taken in conjunction with the accompanying drawing in which.

Figure 1:
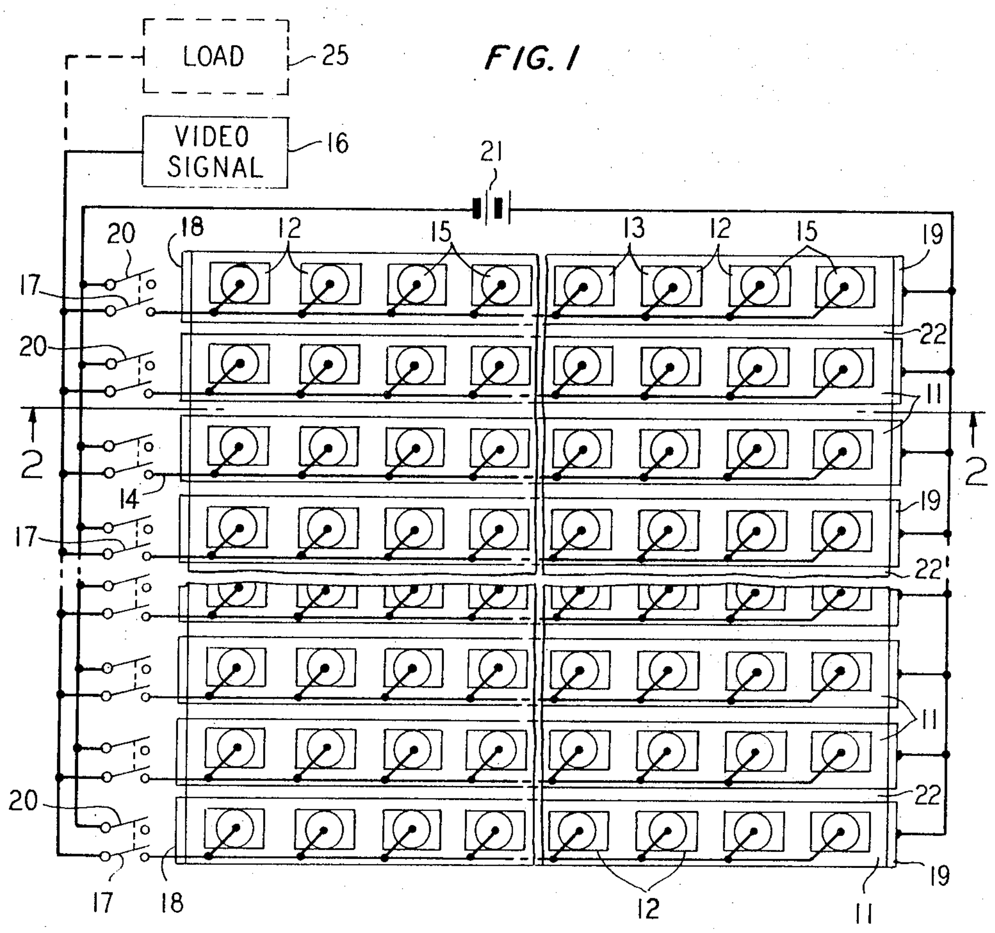
FIG. 1 is a schematic illustration of one embodiment of the invention.
Figure 2:
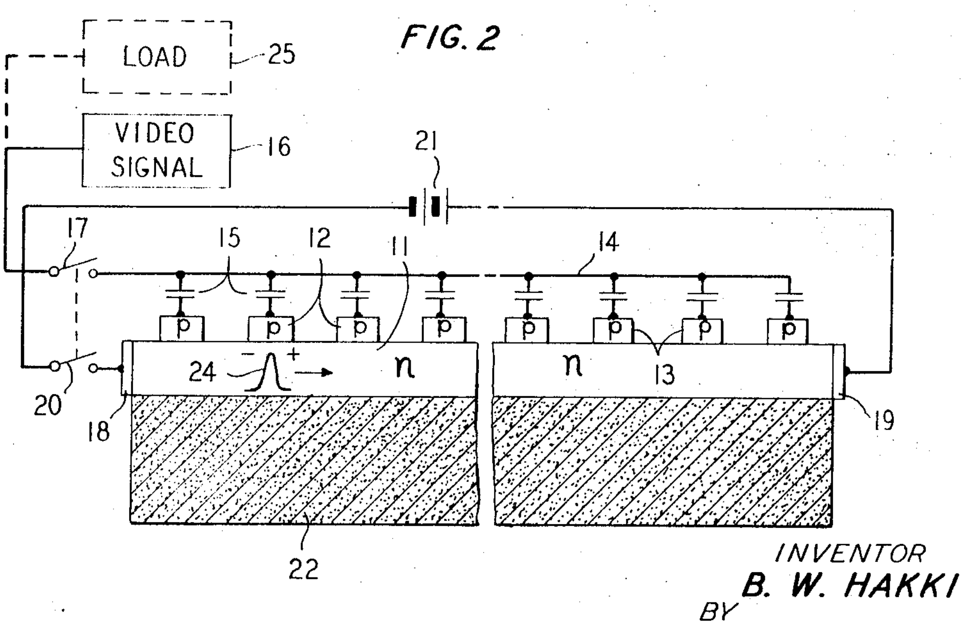
FIG. 2 is a view taken along lines 2—2 of FIG. 1.

Referring now to FIGS. 1 and 2, there is shown schematically, for illustrative purposes, a solid-state display device comprising a plurality of N-type semiconductor strips 11 each having an upper surface to which a plurality of transparent P-type wafers 13 are bonded thereby forming an array of junction diodes 12. Each of the diodes is connected to a conductor 14 by way of individual capacitors 15. Conductors 14 are sequentially connected to a source of input video signals 16 by switches 17. Ohmic contacts 18 and 19 on opposite ends of each semiconductor strip 11 are sequentially connected by switches 20 to a DC voltage source 21. The various semiconductor strips 11 are mounted for support on a semi-insulator sheet 22.

Each of the semiconductor strips 11 are made of a material which exhibits a voltage controlled bulk negative conductivity. As will be explained more fully below, this material may either be a "two-valley" material or an appropriate piezoelectric semiconductor material. When the switch 20 applies the DC voltage from source 21 across a strip 11, a region of high electric field intensity is formed near the cathode contact 18 which quickly grows in intensity to a maximum value and travels in the direction of the anode contact 19. As will be explained later, once a traveling domain is formed, another cannot be formed until the domain is extinguished at the anode contact 19.

As indicated by dashed lines, switches 20 and 17 associated with each of the semiconductor strips 11 are ganged for simultaneous actuation. Appropriate switching apparatus (not shown) sequentially closes the switches 20–17 of the successive semiconductor strips 11. For example, switch 20 of the uppermost strip is closed thereby exciting a traveling domain 24 that travels the length of the strip. After the domain has completed its traverse of the strip, the switch is opened and the switch 20 of the successive semiconductor strip 11 is closed to excite in that strip a similar domain which travels the length of the strip. As a result, all of the diodes of the device are successively scanned by a traveling domain that travels from left to right in the illustration shown. The diodes of a given semiconductor strip are connected to the video signal source 16 through switch 17 only when an electric field domain is traveling through that strip. The design and construction of appropriate apparatus for effecting the switching function described is a matter within the ordinary skill of a worker in the art.

The diodes 12, each of which comprises the transparent P-type wafer 13 and part of the N-type semiconductor strip, are made in a known manner to be electroluminescent in response to an applied bias voltage. As is known, when such diodes are appropriately biased, current across the junction results in a recombination of holes and electrons. Such recombination results from transitions between the conduction band and valence band, which can be either direct or via impurity centers within the band gap, and releases radiation energy in the form of visible light. In the absence of any traveling domain in the semiconductor strip 11, none of the diodes are biased either in the forward or reverse direction. However, when a high electric field domain 24 scans a given diode, part of the junction is biased positively with respect to the other part due to the high voltage drop across the domain, as is shown schematically in FIG. 2. Consequently, part of the junction is forward biased resulting in electron injection into the P-type wafer 13 and the other part of the junction is reverse biased, giving hole injection into the wafer. As described before, the junction current results in radiative recombination and light emission that is visible through the transparent wafer.

The junction current in each diode, and therefore the light emitted by each diode, is a function of any instantaneous voltage applied to the P-type wafer. As a result, the video signal applied to capacitors 15 controls the light emission from each diode as it is scanned by the traveling domain.

From the foregoing, it can be appreciated that the successively formed traveling domains are analogous to a scanning electron beam that forms a raster in a conventional cathode ray tube. If so desired, the video signal could be connected in parallel to all of the strips simultaneously, thereby dispensing with switches 17; this, however, would tend to dissipate the video signal and lower the impedance of the modulating circuit. Further, rather than using the arrays of diodes 12 on each strip, the structure could be simplified merely by using a layer of phosphorescent material to which the video signal is applied. The diodes shown are preferred because they are more efficient than a phosphorescent layer in converting electrical current to radiated light; moreover, one of the advantages of the invention is that its geometry permits the use of electroluminescent diodes whereas such devices cannot be incorporated into prior solid-state display units of the type described above.

If the semiconductor strips are made of two-valley material, they will display a bulk negative conductivity by a mechanism described in detail in the Jan. 1966 issue of Electron Devices, Vol. ED-13, No. 1, a special issue devoted to devices that utilize this phenomenon. Briefly, the negative conductivity results from a transfer of hot electrons from lower energy band minima to higher energy band minima where their effective mass and mobility are greatly increased. These materials include, for example, appropriately doped gallium arsenide, gallium antimonide, indium phosphide, and cadmium telluride.

Figure 3:
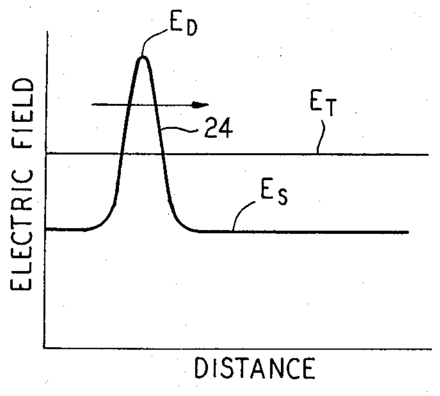
FIG. 3 is a graph of electric field versus distance in one of the semiconductor strips of the device of FIG. 1.

Referring to FIG. 3, a two-valley material will exhibit negative conductivity when subjected to DC electric fields above a prescribed threshold $E_T$. When the field intensity in the material due to an applied DC voltage exceeds $E_T$, a concentration of field intensity occurs near the negative contact giving rise to an electric field domain represented by $E_D$ and a drop in the electric field outside of the domain region as indicated by the portion $E_S$. As mentioned before, the domain $E_D$ will travel in the direction of majority carriers as shown by the arrow, and grow in intensity to some maximum value. Because $E_S$ is below $E_T$, a new domain cannot be formed until the domain $E_D$ has been extinguished at the opposite contact. One drawback of using two-valley material is that the domain velocity, which is approximately equal to the carrier drift velocity, is relatively high, which, in the absence of any modification, requires a high video frequency. As will become clear later, however, camera devices can be made of the same materials as the display devices, thereby generating a video signal that corresponds to the high scanning rate of the display device.

Piezoelectrically active material can also be used for the semiconductor strips 11. As is described, for example, in the U.S. Pat. of D. L. White, No. 3,173,100, granted Mar. 9, 1965, and the paper "Electronic Signal Amplification in the UHF Range with Ultrasonic Traveling Wave Amplifier," John E. May, Jr., Proceedings of the IEEE, Vol. 53, No. 10, Oct. 1965, p. 1,465, appropriately doped piezoelectric semiconductor materials will exhibit a bulk negative conductivity when suitably biased. These references are directed toward the use of such materials for amplification; when an AC signal is applied, it will excite an acoustic wave which will interact with the majority carriers that are traveling along the biased material at the drift velocity. If no signal is applied it can be shown that an acoustic wave with an accompanying traveling domain will be spontaneously generated in such material in substantially the manner illustrated in FIG. 3 when biased above a predetermined threshold. Nucleation of the domain near the negative contact 18 results either from the sudden application of the DC field which establishes an initial perturbation of acoustic energy near the two contacts 18 and 19 or from amplification of thermal noise at the negative contact. The acoustic energy near the negative contact 18 grows into a domain due to interaction with the majority carriers which, of course, are drifting in the direction of the positive contact 19. Initial acoustic perturbations near the positive contact 19 are, on the other hand, attenuated because they experience a positive resistance.

As in the Gunn-effect version, the nucleation of a high field domain reduces the field outside the domain so that another domain cannot form. After the domain reaches a maximum intensity as indicated in FIG. 3, it maintains this high intensity even though current is successively directed to the various diodes. As $E_D$ becomes momentarily attenuated, it is quickly amplified due to the negative conductivity until it again reaches its inherent maximum; current for sustaining this intensity is derived from the battery 21. The length, $L_D$ of a spontaneously generated acoustic traveling domain can be shown to be given approximately by the relation $$L_D = (1K)\,[(2\,\epsilon\,V_d)/(q\,n)\ 1/2 \qquad (1)$$

where $\epsilon$ is the dielectric constant, $V_d$ is the voltage across the domain, $q$ is the charge on a majority carrier, $n$ is the carrier concentration and $K$ is the piezoelectric coupling coefficient. The domain voltage is given by $$v_d = V_a - E_C\,L \qquad (2)$$

where $V_a$ is the voltage applied between the contacts, $E_C$ is the field intensity required to move a majority carrier at the sound velocity in the semiconductor strip, and $L$ is the length of the strip. In either the Gunn-effect or acoustic wave embodiments, the semiconductor strips should be substantially homogeneous and free of defects.

The embodiment of FIGS. 1 and 2 can be used as a television camera device by making each of the diodes 12 of an appropriate material to be photosensitive rather than electroluminescent and connecting the diodes to a load 25, shown in phantom, rather than to a signal source. Again, the P-type wafer 13 of each of the diodes are transparent. As is known, light incident on a photosensitive P-N junction induces a voltage that is proportional to light intensity. As the traveling domain biases each successive diode 12, it causes a local breakdown which is proportional to the photovoltage on the element. The resulting induced voltage in capacitor 15 is a direct measure of the light intensity to which the diode has been subjected. As a result, the successive current increments delivered to the load 25 are proportional to the spatial distribution of light intensity on the diode array and therefore constitutes a video output signal.

The semiconductor strips 11 of the embodiment of FIG. 1 may be 5 to 50 microns thick, with the wafers 13 being 1,000 angstroms thick and 5 to 50 microns wide. For operation in the Gunn mode, the carrier concentration in the strips 11 may be $10^{14}$ to $10^{16}$ carriers per cubic centimeter and in the wafers $10^{17}$ carriers/centimeter$^3$. For gallium arsenide the voltage $E_T$ is approximately $10^7$ divided by the carrier mobility or approximately 3,000 volts per centimeter. For operation in the acoustic mode the strips and wafer may be of cadmium sulfide with $10^{16}$–$10^{17}$ carriers/centimeter$^3$ in the strips and $10^{17}$ carriers/centimeter$^3$ in the wafers. The field $E_T$ is the acoustic velocity divided by carrier mobility which is on the order of 800 to 1,200 volts per centimeter.

Figure 4:
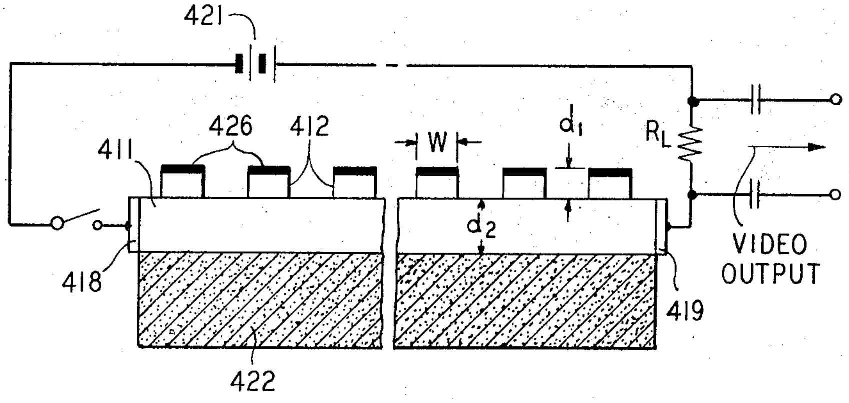
FIG. 4 is a sectional schematic view of another embodiment of the invention.

Rather than taking the output signal from each individual diode, the output signal may be taken across a load resistor in the battery circuit as shown in FIG. 4. To avoid repetition herein, the first digit of the three digit reference numeral will refer to the figure in which it is included, with the second two digits indicating a component having the same function as components of other figures having the same two digit reference numeral. For example, semiconductor strip 411 of FIG. 4 has the same function as semiconductor strip 11 of FIGS. 1 and 2.

The embodiment of FIG. 4 is a light sensitive device in which each of the diodes 412 are photoconductors and the mode of operation of the device is substantially the same as the photosensitive version of FIG. 2 except that output voltages are not taken from the individual diodes. Rather, as a traveling domain scans a diode, an increment of current flows through the photoconductive wafer. This increment of current is a function of light intensity, and a corresponding increment of current flows from the battery 421 to the semiconductor strip 411. This current increment establishes a voltage increment across a resistor $R_L$ which is taken as the video output as shown. Again, a continuous video output is generated that is a function of the spatial distribution of light intensity impinging on the entire device.

The operation of the image sensing device is based on the following considerations: a transparent metal contact 426 having a width $w$ is included on the top surface of each photoconductive wafer 412. Let $d_1$ and $c_1$ be the thickness and conductivity (which is a function of light intensity) respectively of the photoconducting diode. Similarly, $d_2$ and $o_2$ are the O and conductivity respectively of the piezoelectric semiconductor which is carrying the electric field domain. When the domain passes under one of the photoconductive diodes it is shunted by current flowing transverse to the photoconductive film and into the contact 426. The ratio of conductance through the diode $G_1$ to that in the bulk material $G_2$ can be shown to be given approximately by the relation:

$$(G_1/G_2) = \text{“}\ \sigma_1/\sigma_2\ w^2/d_1d_2\ (3)$$

For example, let $w = 20$ microns, $d_2 = 20$ microns, and $d_1 = 0.1$ micron; hence $G_1/G_2 = 100\ o_1/o_2$. For semiconducting material, $o_2 \approx 1$ mho per centimeter, and $10^{-7}$ (unilluminated) $< \sigma_1 < 10^{-2}$ (illuminated) mho per centimeter. Hence, $10^{-5}$ (unilluminated) $< G_1/G_2 < 1$ (illuminated). This shows that current by-passed by photoconductive diode in response to light intensity impinging on it can be substantially increased by adding the contact 426.

From the foregoing, it is apparent that in making the embodiments of FIGS. 2 or 4, compromises must be made in the choice of materials; that is, the semiconductor strip 411 should either be a good two-valley material or a good piezoelectric material while still forming a good electroluminescent junction or a good photosensitive junction with the photoconductive or P-type wafer, which in turn should be transparent. When operating in the acoustic mode, another problem is ensuring that the traveling domain nucleates at a predetermined location in each strip and grows substantially to its maximum value before scanning the first diode of the series. Such design considerations can be implemented in a number of different ways; for example, a distortion in the strip can be introduced near the cathode contact for purposely creating an electric field perturbation that will cause electric field domain nucleation at that location.

Figure 5:
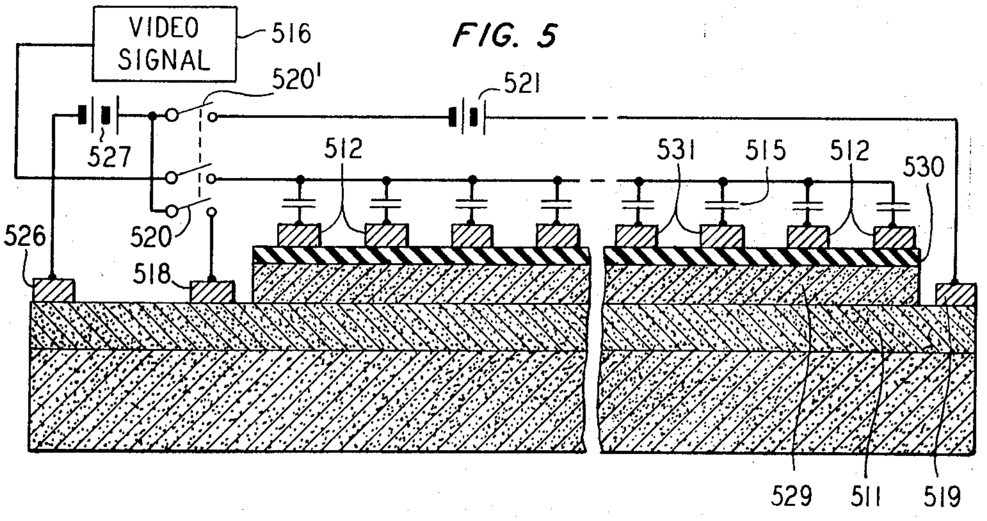
FIG. 5 is a sectional schematic view of another embodiment of the invention.

FIG. 5 shows a display device in accordance with another embodiment of the invention in which a pair of contacts 526 and 518 are located at one end of the semiconductor strip 511. The region of the semiconductor strip between contacts 526 and 518 is made of two-valley material while the portion between contacts 518 and 519 are made of piezoelectric semiconductor material. When switches 520 and 520' are closed, a bias voltage from a battery 527 is applied between contacts 526 and 518 which is sufficient to trigger a Gunn-effect traveling domain at contact 526 which travels toward contact 518. When the traveling domain reaches contact 518, it is not quenched by the contact; rather, it launches an acoustic wave which travels toward contact 519 by the mechanism described before. The Gunn-effect domain constitutes a trigger for initiating the acoustic wave at a predetermined location in the strip 511.

The semiconductor strip 511 may be made of gallium arsenide which is cut such that its longitudinal dimension is along the 110 crystallographic axis. With this provision, the strip will exhibit piezoelectric properties and acoustic waves will propagate at a velocity of approximately $3.5 \times 10^5$ centimeters per second. The portion between contacts 526 and 518 may have a length of about 150 microns, and a doping concentration of about $10^{16}$ carriers per cubic centimeter. Battery 527 may then provide an electric field between contacts 526 and 518 of about 3,000 volts per centimeter for triggering Gunn-effect domains. The length of the semiconductor strip between contacts 518 and 519 may be about 2 to 3 inches with a carrier concentration of $10^{16}$ to $10^{17}$ carriers per cubic centimeter. Battery 521 may provide an electric field of about 100 to 200 volts per centimeter between contacts 518 and 519 which would be then sufficient to sustain the acoustic domain as it propagates at the sound velocity. Another advantage of using gallium arsenide as the semiconductor strip 511 is that the voltage applied by battery 521 for giving majority carrier velocities that approximate the sound velocity as required for acoustic wave interaction, is lower than that for other piezoelectric semiconductor materials.

Rather than making the light-emitting junctions of the diodes dependent upon the material of the semiconductor strip 511, the diodes 512 are MIS (for metal-insulator-semiconductor) diodes of the type described in the application of C. N. Berglund, Ser. No. 571,555, filed Aug. 10, 1966, and assigned to Bell Telephone Laboratories, Incorporated. As described in this application, efficient light emission can be obtained by reverse biasing a diode comprising a layer of dielectric sandwiched between a metal layer and a semiconductor layer, to generate minority carriers in the semiconductor at the dielectric interface, then forward biasing the diode to inject the minority carriers into the bulk of the semiconductor where they recombine to give visible radiation. In the device of FIG. 5, MIS diodes 512 are formed by a layer of semiconductor material 529, a layer of insulating material 530 and metal elements 531. As the traveling domain passes each diode defined by one of the metal elements, it reverse biases the diode then forward biases it to cause radiative recombination as described in the Berglund application.

The semiconductor layer 529 may be activated zinc oxide or zinc sulfide having a thickness of about 1,000 angstroms. The insulator may be about 1,000 angstroms thick and the metallic elements 531 about 400 angstroms thick so that they are both substantially transparent. As suggested before, an advantage of using MIS diodes is that they can be fabricated independently of the material used for the semiconductor strip.

Figure 6:
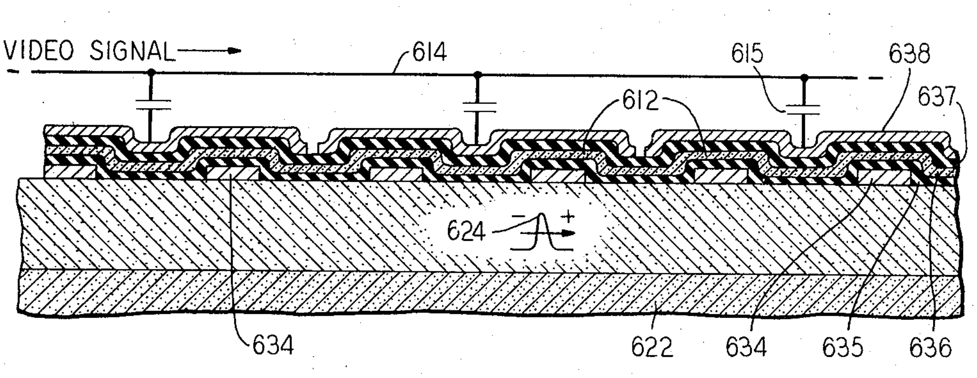
FIG. 6 is a sectional schematic view of another embodiment of the invention.

Another embodiment which makes even more efficient use of MIS diodes is shown in FIG. 6. The individual diodes 612 are defined by a succession of metal elements 634 deposited directly on the semiconductor strip. The metal elements are then overlayed with a first layer of insulating material 635, a semiconductor layer 636, a second insulating layer 637, and an upper metal layer 638. The diodes are arranged in pairs with the upper metal layer 638 interconnecting the diodes of each pair and a capacitor 615 connecting each pair with the line 614. As will become clear, each diode pair acts as a unit so that modulated light emission takes place from each diode pair rather than from each individual diode.

Because of the multiple layers that are used, each diode 612 in effect constitutes two diodes, one being defined by metal elements 634, first insulator 635, and semiconductor 636, and the other defined by upper metal layer 638, second insulator layer 637 and the semiconductor layer 636. When a traveling domain reaches a location between the diodes of a pair, the diodes are biased with respect to each other by the voltage on opposite sides of the domain as shown at 624. As a result, minority carriers are generated at both interfaces of the semiconductor layer 636 with the insulator layers 635 and 637 by the mechanism described in the Berglund application. As the domain 624 traverses the diode pair, the bias on the semiconductor layers reverses and light is emitted.

The construction of diodes 612 increases efficiency because minority carriers are generated at both surfaces of the semiconductor layer, rather than at only one surface. Another advantage is that the voltage of the domain 624 is impressed across two diodes including four semiconductor-insulator junctions, rather than across only a single semiconductor-insulator junction; this reduces the danger of material breakdown due to excessive domain voltage. Finally, a substantially constant bias voltage is exerted on the diodes during the time it takes the domain to travel between successive elements 634. This gives each diode more time to generate the minority carriers responsible for radiative recombination. The dimensions of this embodiment may correspond to that of analogous elements of FIG. 5; the metal layer 638 and insulator layer 637 should be thin enough to be transparent.

Figure 7:
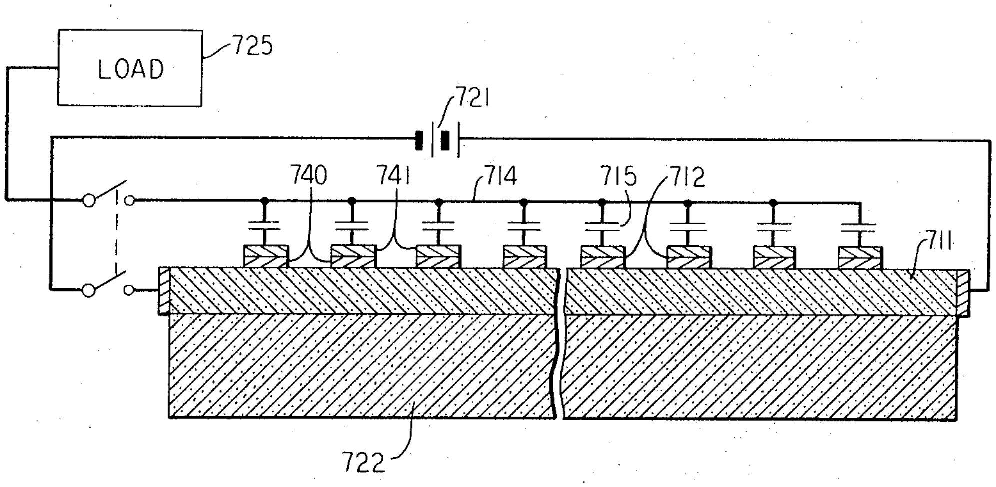
FIG. 7 is a sectional schematic view of still another embodiment.

FIG. 7 shows still another embodiment which has certain advantages of ease of fabrication. The semi-insulating substrate 722 is cadmium sulfide upon which is epitaxially grown a layer of N-type cadmium sulfide having a doping level of $10^{16}$–$10^{17}$ carriers per cubic centimeter which constitutes the semiconductor strip 711. As is known, epitaxial growth is a technique that can be used to yield a highly homogeneous and defect-free crystalline structure. A layer of N-type Ca $As_x P_{1-x}$ having a doping level of $10^{12}$–$10^{18}$ carriers per cubic centimeter and a thickness of approximately 1,000 angstroms is then grown by vapor transport on the top surface of the semiconductor strip 711. This layer eventually becomes N-type water components 740 of diodes 712. A layer of P-type Ca $As_x P_{1-x}$ having a doping level of $10^{17}$–$10^{18}$ carriers/centimeter$^3$ and a thickness of approximately 1,000 angstroms is then grown on top of the N-type layer which eventually becomes P-type wafers 741. Photoresist techniques are used to etch part of the Ca $As_x P_{1-x}$ layers to define the wafers 740, 741 and therefore the individual diodes 712. The P-N junctions of the diodes then constitute efficient light emitters as described before.

In summary, it can be appreciated that my invention can be used to provide efficient and practical solid-state television display units and solid-state television camera devices. Television camera devices and display devices operating on the same principles that are used in a single system can give advantages of simplicity because the scanning rates of the camera devices can be made to be identical with those of the display devices therefore obviating the need for special switching systems or scanning rate converters. Among the other advantages of my invention are the efficiency of conversion from electrical energy to light energy and vice versa, and the minimizing or elimination of attenuation of traveling electric field domains that form the raster. The specific embodiments described are intended to be only illustrative of the principles of the inventive concept. For example, while all of the semiconductor strips were shown as being of N-conductivity type, they could also be P-type. Various other embodiments and modifications may be made by those skilled in the art without departing from the spirit and scope of the invention.

What is claimed is:

1. A light sensing device comprising:

a plurality of elongated strips of semiconductor material;

a plurality of photosensitive P-N junction diodes disposed contiguous with a surface of each strip;

the junction of each diode being substantially parallel to the major dimension of its respective semiconductor strip;

each junction being longer than the width of a traveling domain generated in its respective semiconductor strip, whereby as a domain traverses a given junction a large voltage gradient is produced along the length of such junction;

and means for forming internally generated traveling electric field domains within the strips comprising a DC voltage source and first switching means for sequentially applying the voltage potential of said source successively across a major portion of the length of said strips.

2. The light sensing device of claim 1 further comprising a second switching means for capacitively coupling the photosensitive elements to a load through output signal removing means in sequence with the application of the DC voltage across the respective semiconductor strips.

3. The light sensing device of claim 1 wherein a load is coupled between said first switching means and said strips.

4. The light sensing device of claim 1 wherein the semiconductor strip is made of two-valley material and the DC voltage applied to each strip is sufficiently high to create within such strip Gunn-effect traveling electric field domains.

5. The light sensing device of claim 1 wherein the semiconductor strip is made of piezoelectric material and the DC voltage applied to each strip is sufficiently high to create within such strip acoustic traveling electric field domains.

6. A light sensing device comprising: field;

a plurality of elongated semiconductor strips each characterized by a voltage-controlled bulk negative conductivity and a capacity for internally generating confined high electric field traveling domains in response to appropriately high applied DC electric field;

a plurality of photosensitive P-N junction diodes disposed contiguous with a surface of each strip;

and means for sequentially exciting traveling electric field domains in said strips comprising means for sequentially applying a D-C voltage across the length of each strip.

* * * * *

UNITED STATES PATENT OFFICE

CERTIFICATE OF CORRECTION

Patent No. 3,654,476 Dated April 4, 1972

Inventor(s) Basil W. Hakki

It is certified that error appears in the above-identified patent and that said Letters Patent are hereby corrected as shown below:

Column 5, Equation (1), should read --$L_D = \frac{1}{K} \left(\frac{2 \varepsilon V_d}{a\ n}\right)^{1/2}$--.

Column 6, line 28, "$c_1$" should read --$\sigma_1$--;

line 30, "$o_2$" should read --$\sigma_2$--,

"O" should read --thickness--;

Equation (3), should read --$\frac{G_1}{G_2} = \frac{1}{2} \frac{\sigma_1}{\sigma_2} \frac{w^2}{d_1 d_2}$--;

line 41, "$o_1/o_2$" should read --$\sigma_1/\sigma_2$--;

line 42, "$o_2$" should read --$\sigma_2$--.

Column 8, lines 27, 32 and 37, "Ca $As_x$ $P_{1}\bar{\ }_{x}$" should read --Ga $As_x$ $P_{1-x}$--.

Column 10, line 3, after "comprising:" delete "field;".

Signed and sealed this 7th day of November 1972.

(SEAL)
Attest:

EDWARD M.FLETCHER,JR.
Attesting Officer

ROBERT GOTTSCHALK
Commissioner of Patents